US012750666B2

(12) United States Patent
Di Mattia

(10) Patent No.: US 12,750,666 B2
(45) Date of Patent: Sep. 29, 2026

(54) AUTOMATICALLY ASSOCIATING SECURITY POLICY WITH A USER ON VIDEO BASED ON Wi-Fi DATA

(71) Applicant: Fortinet, Inc., Sunnyvale, CA (US)

(72) Inventor: Aldo Di Mattia, Rome (IT)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/756,220

(22) Filed: Jun. 27, 2024

(65) Prior Publication Data

US 2026/0006437 A1 Jan. 1, 2026

(51) Int. Cl.

| | |
|---|---|
| ***H04W 12/06*** | (2021.01) |
| ***G06T 7/70*** | (2017.01) |
| ***G06V 10/774*** | (2022.01) |
| ***G06V 20/40*** | (2022.01) |
| ***G06V 20/52*** | (2022.01) |
| ***G06V 40/16*** | (2022.01) |

(52) U.S. Cl.

CPC ............... *H04W 12/06* (2013.01); *G06T 7/70* (2017.01); *G06V 10/774* (2022.01); *G06V 20/41* (2022.01); *G06V 20/52* (2022.01); *G06V 40/172* (2022.01); *G06T 2207/10016* (2013.01); *G06T 2207/30196* (2013.01); *G06T 2207/30232* (2013.01); *G06T 2207/30244* (2013.01)

(58) Field of Classification Search

CPC ......... H04W 12/06; G06T 7/70; G06V 20/52; G06V 20/41; G06V 40/172; G06V 10/774

See application file for complete search history.

(56) References Cited

U.S. PATENT DOCUMENTS

| | | | | |
|---|---|---|---|---|
| 9,286,776 | B1 * | 3/2016 | Morton | H04W 4/029 |
| 10,594,987 | B1 * | 3/2020 | Nixon | H04N 7/18 |
| 12,417,632 | B2 * | 9/2025 | Adam | G06V 40/172 |
| 2015/0324634 | A1 * | 11/2015 | Brosens-Kessels | G06Q 50/10 382/103 |
| 2015/0347829 | A1 * | 12/2015 | Carbonell | G06Q 10/00 382/103 |
| 2018/0061158 | A1 * | 3/2018 | Greene | G06V 20/52 |
| 2020/0053559 | A1 * | 2/2020 | Kim | G08B 13/00 |
| 2020/0096599 | A1 * | 3/2020 | Hewett | G01S 13/878 |
| 2021/0334549 | A1 * | 10/2021 | Ekkel | G08B 13/19641 |
| 2022/0210341 | A1 * | 6/2022 | Hwang | G06V 40/70 |

FOREIGN PATENT DOCUMENTS

| | | | | |
|---|---|---|---|---|
| AU | 2010328470 | B2 * | 9/2014 | G01S 5/0264 |

* cited by examiner

*Primary Examiner* — Clayton R Williams

(74) *Attorney, Agent, or Firm* — Law Office of Dorian Cartwright; Dorian Cartwright

(57) ABSTRACT

An area on video is monitored that overlaps a radio range of an access point on the data communication network. Failure to identify a person currently within the Wi-Fi area and shown on video is detected. Parallel Wi-Fi parameters for a device associated with the person in the video, including a group identification assigned to the person is received. The parallel Wi-Fi parameters are used to identify the person. A machine learning module, or other image recognition system, can be updated with images to build a machine learning recognition model from a history of images associating the identified person. Finally, a surveillance security policy of the identified group is associated with the identified person.

20 Claims, 5 Drawing Sheets

AUTOMATICALLY ASSOCIATING SECURITY POLICY WITH A USER ON VIDEO BASED ON Wi-Fi DATA

FIELD OF THE INVENTION

The invention relates generally to computer networks, and more specifically, for automatically associating a surveillance security policy with a person on video based on Wi-Fi data.

BACKGROUND

Video surveillance such as Closed-Circuit Television (CCTV) can be used to monitor physical areas around a home, business, assets or the like, by a system of cameras, display units and recorders. Areas are monitored for specific behaviors, especially improper or damaging behaviors. Image recognition can be utilized to identify persons involved in specific behavior.

However, image recognition is not always optimal or reliable. For example, lighting conditions and distance from a video camera can denigrate video quality to the point of impeding the recognition. As a result, many persons can remain unidentified by video surveillance. In particular, a new system that has not built up a sufficient database of images for reliable facial recognition will be unable to operate based on an identify of persons under surveillance.

What is needed is a robust technique for automatically associating a surveillance security policy with a person on video based on Wi-Fi data.

SUMMARY

To meet the above-described needs, methods, computer program products, and systems for automatically associating a surveillance security policy with a user on video based on Wi-Fi data.

In one embodiment, an area on video is monitored that overlaps a radio range of an access point on the data communication network. Failure to identify a person currently within the Wi-Fi area and shown on video is detected.

In another embodiment, parallel Wi-Fi parameters for a device associated with the person in the video, including a group identification assigned to the person is received. The parallel Wi-Fi parameters are used to identify the person. A machine learning module, or other image recognition system, can be updated with images to build a machine learning recognition model from a history of images associating the identified person.

In yet another embodiment, a surveillance security policy of the identified group is associated with the identified person.

Advantageously, security surveillance is improved with enhanced data about persons identified in video.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for automatically associating a surveillance security policy with a user on video based on Wi-Fi data. The following disclosure is limited only for the purpose of conciseness, as one of ordinary skill in the art will recognize additional embodiments given the ones described herein. For example, Wi-Fi assistance is referred to throughout the disclosure, although other types of radio assistance is possible such as Bluetooth, cellular, and the like.

Figure 2:
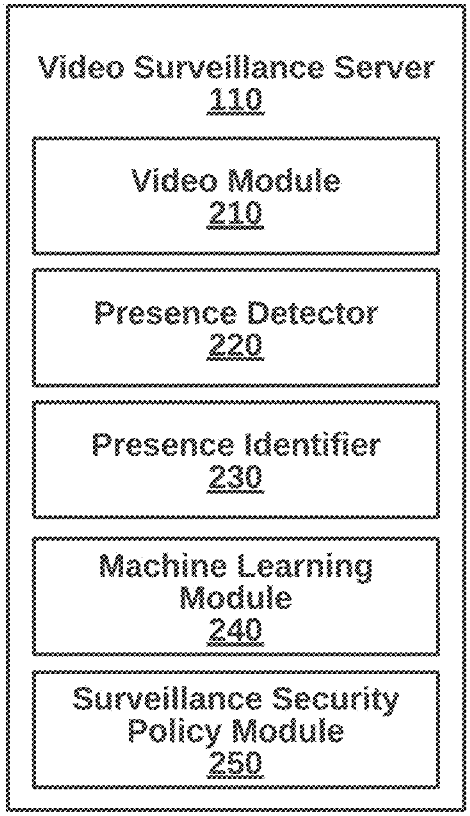
FIG. 2 is a more detailed block diagram illustrating a video surveillance server of the system of FIG. 1, according to an embodiment.
Figure 3:
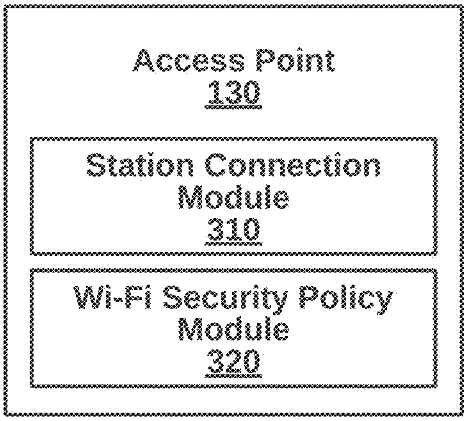
FIG. 3 is a more detailed block diagram illustrating an access point of the system of FIG. 1, according to an embodiment.

I. Systems for Wi-Fi Assisted Surveillance Security (FIGS. 1-3)

Figure 1:
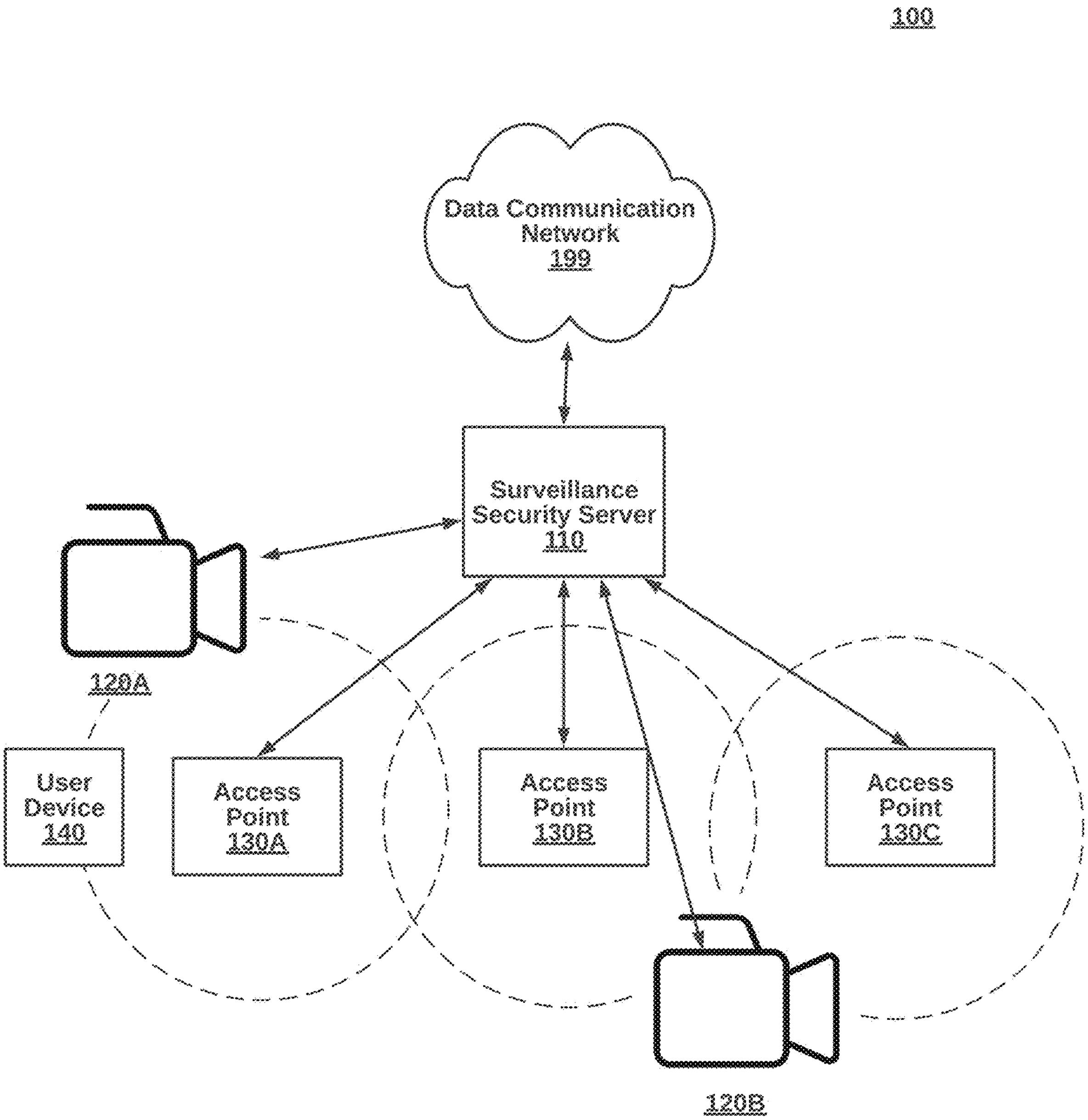
FIG. 1 is a high-level block diagram illustrating aspects of a system for automatically associating a surveillance security policy with a user on video based on Wi-Fi data, according to some embodiments.
Figure 6:
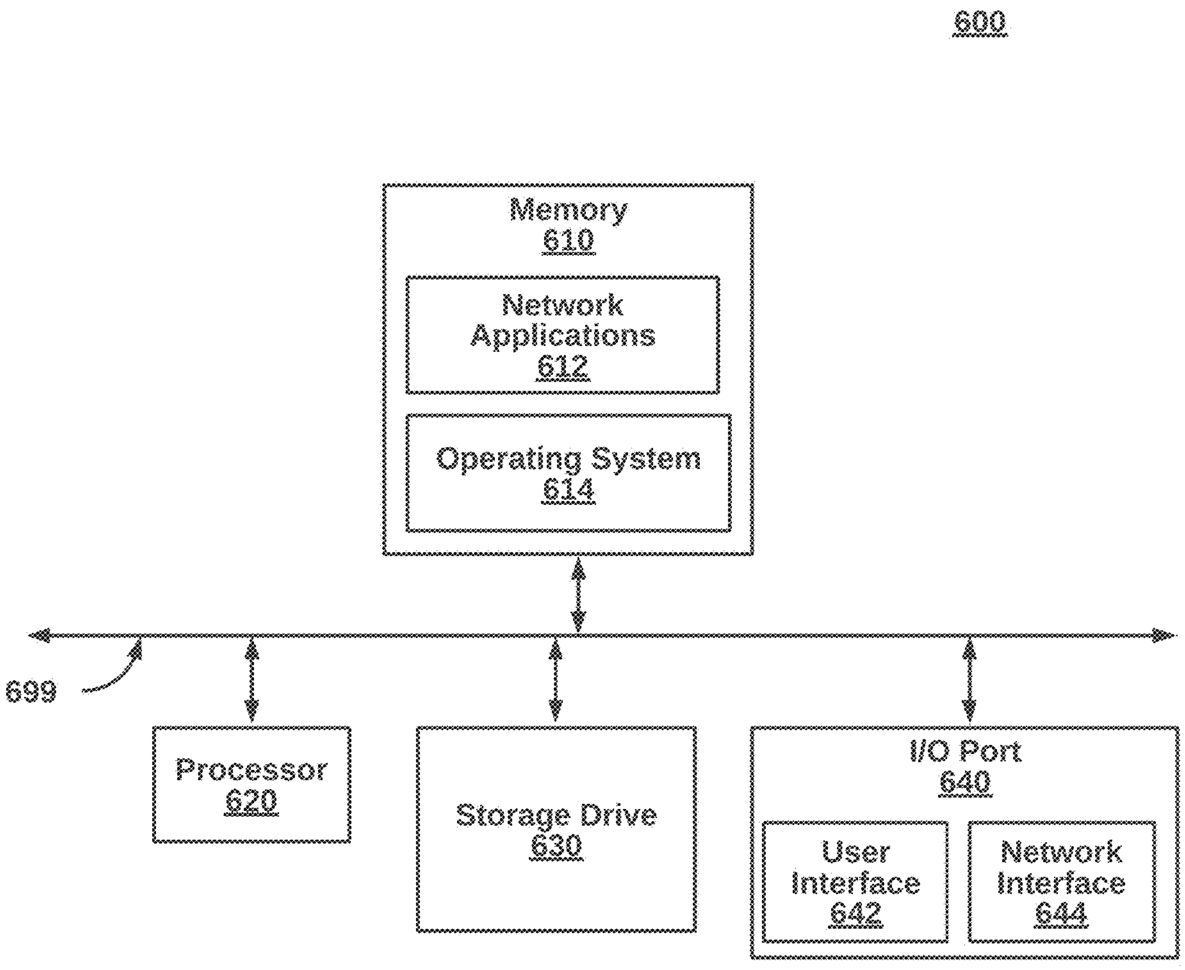
FIG. 6 is a block diagram illustrating an example computing device for the system of FIG. 1, according to an embodiment.

FIG. 1 is a high-level block diagram illustrating a system 100 for automatically associating a surveillance security policy with a user on video based on Wi-Fi data, according to an embodiment. The system 100 includes a surveillance security server 110, a plurality of security cameras 120A-B, a plurality of access points 130A-C, and user device 140 associated with a person, on a data communication network. Other embodiments of the system 100 can include additional components that are not shown in FIG. 1, such as routers, switches, network gateways, and firewalls, and access points. Further, there can be more security cameras, access points and user devices. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system via hard wire (e.g., surveillance server 110, security cameras 120A-B, and access points 130A-C). The components can also be connected via wireless networking (e.g., user device 140). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use IPV4 or Ipv6 address spaces.

In one embodiment, the video surveillance server 110 uses input from Wi-Fi to identify persons recognized on video. The security cameras 120A-B. The access points 130A-C manage Wi-Fi access for user devices to an enterprise network and to the Internet, and thus, need to collect Wi-Fi parameters to manage the connection. The user devices 140A-C can be a personal computer, a laptop, a smartphone, a tablet, a terminal, or any other appropriate processor-driven device.

FIG. 2 is a more detailed block diagram illustrating the video surveillance server 110 of the system of FIG. 1, according to one embodiment. The video surveillance server 110 includes a video module 210, a presence detector 220, a presence identifier 230, a machine learning module 240 and a surveillance security policy module 250. The components can be implemented in hardware, software, or a combination of both.

The video module 210 monitors an area on video that overlaps a radio range of an access point on the data communication network.

The presence detector 220, responsive to failing to identify a person currently within the area and shown on video, receives in parallel Wi-Fi parameters for a device associated with the person in the video, including a group identification assigned to the person.

The presence identifier 230, in an embodiment, identifies the person using the parallel Wi-Fi parameters and adds one or more images of the person to storage for future identifications.

The machine learning module 240 can build a machine learning recognition model from a history of images associating the identified person. Images can be preloaded or collected. Some embodiments operate without the machine learning moule 240. Other embodiments use alternatives to machine learning, such as image recognition, prediction models, or artificial intelligence.

The surveillance security policy module 250 automatically associates a surveillance security policy of the identified group with the identified person. Rules can be configured by end users, network administrators, or automatically by software. Rules can be general and also specific to persons. For example, a specific user may be allowed Wi-Fi access in certain areas under Wi-Fi rules but be denied physical access in the same areas under surveillance rules. Wi-Fi can provide a location in addition to an identification.

FIG. 3 is a more detailed block diagram illustrating the access points 130A-C (represented by access point 130) of the system of FIG. 1, according to one embodiment. The access point 130 includes a station connection module 310 to authenticate users and collect and generate Wi-Fi parameters associated with the user. General Wi-Fi parameters for the aggregate users can also be tracked. A Wi-Fi security policy module 320 can implement Wi-Fi rules. These rules can overlap or be distinctive with surveillance security rules. The components can be implemented in hardware, software, or a combination of both.

II. Methods for Wi-Fi Assisted Surveillance Security (FIGS. 4-5)

Figure 4:
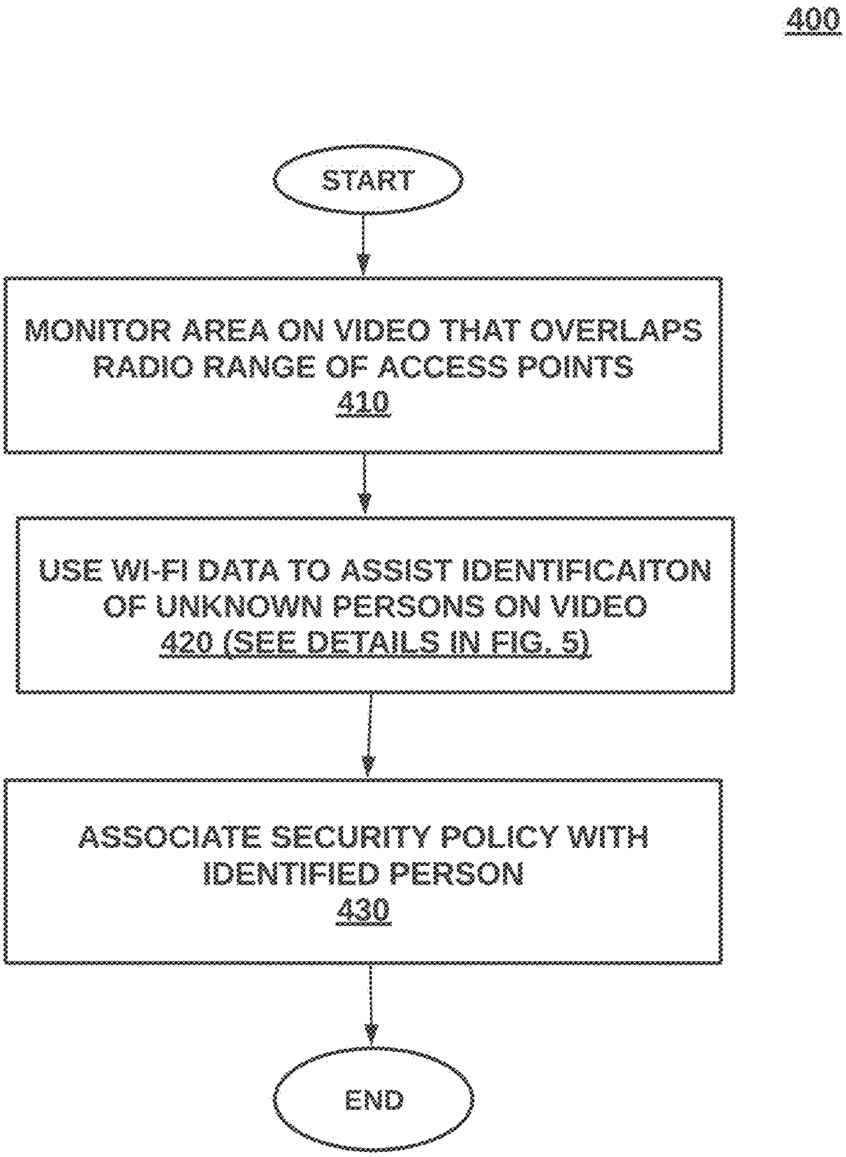
FIG. 4 is a high-level flow diagram illustrating a method for Wi-Fi assisted video surveillance, according to an embodiment.
Figure 5:
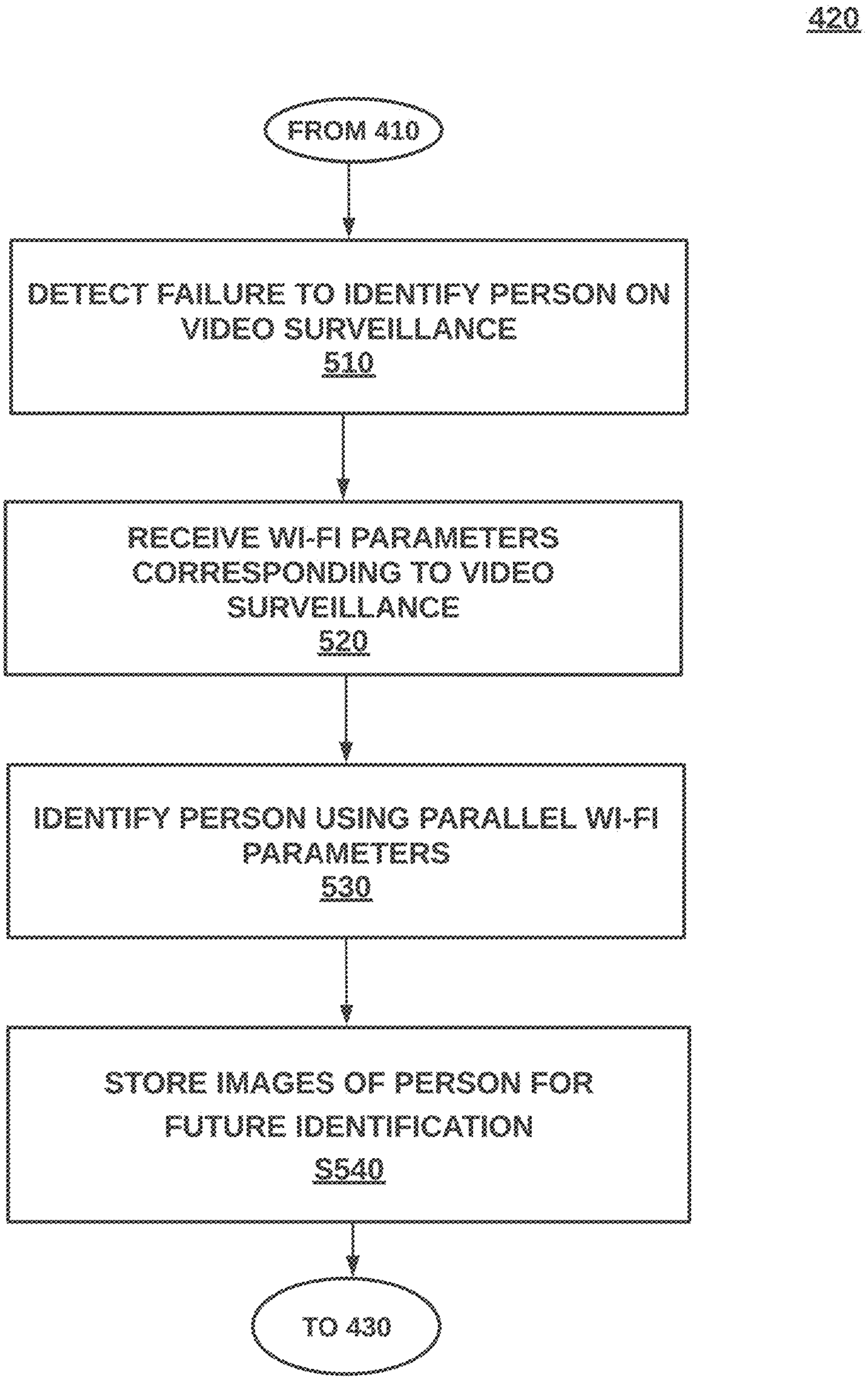
FIG. 5 is a flow diagram illustrating a step of automatically associating a surveillance security policy with a user on video based on Wi-Fi data, from the method of FIG. 5, according to an embodiment.

FIG. 4 is a high-level flow diagram of a method 400 for automatically associating a surveillance security policy with a user on video based on Wi-Fi data, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, an area is monitored on video that overlaps a radio range of an access point on the data communication network.

At step 420, Wi-Fi data assists in identification of unknown persons on video monitoring, as described further below.

At step 430, a surveillance security policy of the identified group is automatically associated with the identified person.

More specifically, FIG. 5 shows details of step 420, according to an embodiment.

At step 510, identification fails for a person currently within the area. In one case, the video surveillance system uses image recognition to match faces. But in some cases, there are no images or not a sufficient number of images to rely upon. In other cases, a persons face is precluded and prevents image recognition.

At step 520, Wi-Fi parameters for a device associated with the person in the video, including a group identification assigned to the person are received. Time stamps can help correlate the two separate streams of data.

At step 530, the person is identified using the parallel Wi-Fi parameters.

At step 540, one or more images of the person to storage for future identifications using a machine learning recognition model is built from a history of images associating the identified person.

III. Computing Device for Wi-Fi Assisted Surveillance Security (FIG. 6)

FIG. 6 is a block diagram illustrating a computing device 600 for use in the system 100 of FIG. 1, according to one embodiment. The computing device 600 is a non-limiting example device for implementing each of the components of the system 100, including surveillance security server 110, video cameras 120A-B, access points 130A-C and user device 140. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a video surveillance system, on a data communication network, for automatically associating a surveillance security policy with a user on video based on Wi-Fi data, the method comprising:

monitoring an area with a video camera that overlaps a radio range of an access point on the data communication network;

failing to identify a person currently within the area and shown on video;

receiving Wi-Fi parameters for a device associated with the person in the video, including a group identification assigned to the person;

receiving, from a network device, an identification of the person generated using the Wi-Fi parameters for the device associated with the person in the video;

receiving, from the video camera, one or more images of the person for storage for future identifications;

building a machine learning recognition model from a history of images associated with the identified person; and automatically associating a surveillance security policy of the identified group with the identified person currently shown on video.

2. The method of claim 1, further comprising adjusting the surveillance security policy of the identified group of the identified person currently shown on the video.

3. The method of claim 1, further comprising adjusting the surveillance security policy of the identified person.

4. The method of claim 1, further comprising taking a security action based on the identified person and a violation of the surveillance security policy associated with the identified person currently shown on the video.

5. The method of claim 1, wherein the security action comprises one or more of adjusting Wi-Fi access, raising a flag, notifying security personnel, and warning the identified person through Wi-Fi.

6. The method of claim 1, wherein physical coordinates are associated with a plurality of access points on the data communication network and wherein physical coordinates are associated with a plurality of video cameras, for identifying the person in the video.

7. The method of claim 1, comparing location coordinates associated with the device of the person in the video against location coordinates associated with the video camera.

8. The method of claim 1, wherein the person is detected by multiple video cameras including the video camera, and wherein location coordinates of the person are derived by triangulating location coordinates associated with the multiple video cameras.

9. The method of claim 1, wherein the device of the person is detected by multiple access points, and wherein location coordinates of the person are derived by triangulating location coordinates associated with the multiple access points.

10. The method of claim 1, wherein, at a subsequent time, the person is identified by artificial intelligence using the machine learning model.

11. The method of claim 1, wherein the person is identified using facial recognition.

12. The method of claim 1, wherein the Wi-Fi parameters comprise one or more of MAC address, host information, device identification, and manufacturer.

13. The method of claim 1, wherein the Wi-Fi parameters comprise one or more of signal strength, access point identifier, SSID and username and/or groups.

14. The method of claim 1, wherein receiving the Wi-Fi parameters comprises receiving, from the access point, one or more of a device identifier, a media access control address, a signal strength value, an access point identifier, a service set identifier, a username, or a group identifier associated with the device.

15. The method of claim 1, wherein the identification of the person is generated by correlating a location of the device determined from the Wi-Fi parameters with a location of the person shown in the video.

16. The method of claim 15, wherein correlating the location of the device with the location of the person comprises comparing a physical coordinate associated with the access point to a physical coordinate associated with the video camera.

17. The method of claim 1, wherein the one or more images of the person received from the video camera are stored in association with the identification of the person received from the network device.

18. The method of claim 1, wherein the surveillance security policy comprises a physical-area access policy that is different from a Wi-Fi access policy associated with the identified person.

19. A non-transitory computer-readable medium in a video surveillance system, on a data communication network, storing code that when executed, performs a method for automatically associating a surveillance security policy with a user on video based on Wi-Fi data, the method comprising:

monitoring an area with a video camera that overlaps a radio range of an access point on the data communication network;

failing to identify a person currently within the area and shown on video;

receiving Wi-Fi parameters for a device associated with the person in the video, including a group identification assigned to the person;

receiving, from a network device, an identification of the person generated using the Wi-Fi parameters for the device associated with the person in the video;

receiving, from the video camera, one or more images of the person for storage for future identifications;

building a machine learning recognition model from a history of images associated with the identified person; and automatically associating a surveillance security policy of the identified group with the identified person currently shown on video.

20. A video surveillance system, on a data communication network, for automatically associating a surveillance security policy with a user on video based on Wi-Fi data, the video surveillance system comprising:

a processor;

a network interface communicatively coupled to the processor and to a data communication network; and a memory, communicatively coupled to the processor and storing:

a video module to monitor an area on video that overlaps a radio range of an access point on the data communication network;

a presence detector to fail to identify a person currently within the area and shown on video, wherein the presence detector receives Wi-Fi parameters for a device associated with the person in the video, including a group identification assigned to the person, wherein the presence detector to receive, from a network device, an identification of the person generated using the Wi-Fi parameters and to receive, from the video camera, one or more images of the person to storage for future identifications;

a machine learning module to build a machine learning recognition model from a history of images associating the identified person; and a surveillance security policy module to automatically associate a surveillance security policy of the identified group with the identified person.

* * * * *